United States Patent
Bareel

[19]
[11] 4,310,588
[45] Jan. 12, 1982

[54] SLIDING ELEMENT INTENDED FOR USE IN SKATING

[76] Inventor: Jean-Michel Bareel, Avenue du Cerf-Volant, 9, 1170 Bruxelles, Belgium

[21] Appl. No.: 129,816

[22] Filed: Mar. 12, 1980

[30] Foreign Application Priority Data

Apr. 3, 1979 [BE] Belgium .................... 194387

[51] Int. Cl.³ .................... B32B 7/00; B32B 7/02; B32B 27/00; B32B 27/42
[52] U.S. Cl. .................... 428/251; 428/262; 428/268; 428/269; 428/402; 428/421; 428/447; 428/523; 521/89; 521/91; 528/12; 528/246; 528/397; 528/401
[58] Field of Search .............. 428/442, 447, 251, 262, 428/268, 269, 402, 421, 422, 522, 523; 521/82, 85, 89, 91, 92, 98; 280/11, 12, 610; 272/3, 56.5 R; 528/10, 12, 246, 397, 401

[56] References Cited

U.S. PATENT DOCUMENTS

| | | | |
|---|---|---|---|
| 3,497,211 | 2/1970 | Nagin | 280/11.12 |
| 3,508,945 | 4/1970 | Haemer et al. | 272/3 |
| 3,552,746 | 1/1971 | Nagin | 280/11.12 |
| 3,950,599 | 4/1976 | Board, Jr. | 428/422 |
| 4,012,551 | 3/1977 | Bogarty | 428/422 |
| 4,030,729 | 6/1977 | Nathaniel | 272/3 |
| 4,093,268 | 6/1978 | Sampson et al. | 280/610 |
| 4,102,046 | 7/1978 | Downing et al. | 428/422 |
| 4,131,711 | 12/1978 | Attwood | 428/422 |
| 4,141,873 | 2/1979 | Dohany | 428/421 |
| 4,156,049 | 5/1979 | Hodes et al. | 428/422 |
| 4,169,904 | 10/1979 | Czornyj et al. | 428/422 |
| 4,178,273 | 12/1979 | Brown | 428/421 |
| 4,194,040 | 3/1980 | Breton et al. | 428/328 |
| 4,196,249 | 4/1980 | Patrichi | 428/328 |
| 4,208,462 | 6/1980 | Dauphin et al. | 428/421 |
| 4,232,089 | 11/1980 | Bordini et al. | 428/523 |
| 4,241,144 | 12/1980 | Hendy | 428/523 |
| 4,255,462 | 3/1981 | Gebauer et al. | 428/421 |

*Primary Examiner*—William J. Van Balen
*Attorney, Agent, or Firm*—Sughrue, Mion, Zinn, Macpeak & Seas

[57] ABSTRACT

The sliding layer of the element is constituted by a base resin which is self-lubricating or is rendered physically and/or chemically self-lubricating by the addition of a self-lubricating substance, particularly a self-lubricating resin, e.g. a silicone resin, a polyvinylidene fluoride resin, a furan resin. Additional substances are incorporated for rendering the base resin compressible, shock-resistant, electrically antistatic or mechanically reinforced.

22 Claims, 4 Drawing Figures

SLIDING ELEMENT INTENDED FOR USE IN SKATING

BACKGROUND OF THE INVENTION

The present invention relates to a sliding element intended for use in skating.

A sliding element for skating tracks and the like is already known. This known element comprises a solid board bearing sliding layer of synthetic resin and having a sliding surface. The board consists of a layered thermosetting synthetic material, such as polyester, and may optionally be reinforced with a wooden core embedded in this material. The base resin of the sliding layer is high density polyethylene. The known sliding elements have disadvantages which are inherent primarily in the resin of which the sliding layer is made, i.e. the polyethylene.

In fact, polyethylene has a high coefficient of friction in relation to metals or metal alloys and particularly with regard to steel. Therefore, in order to make the known elements suitable for use their sliding surface frequently has to be covered with a thin layer of lubricating agents, in the form of liquids or waxes, in order to reduce this coefficient of friction of metal to polyethylene. The known elements are therefore not very economical to use in skating rinks or the like. Moreover, polyethylene has a softening point of the order of 120° C. (VICAT softening point by the DIN 53460, ISOR 306 and ASTMD 1525-58T methods) and a temperature of bending under load of 70° C. (method B, 4.6 kg/m$^2$—DIN 53461, ISOR 75, ASTMD 648-56). These relatively low temperatures limit the application of the known elements to open air tracks which are not exposed to any considerable heat radiation such as might occur in hot countries, for example.

SUMMARY OF THE INVENTION

The object of the present invention is to provide improvements in sliding elements which remedy the abovementioned disadvantages of the known types. For this purpose, in the new sliding element, the base resin which constitutes the sliding layer is self-lubricating or is rendered physically and/or chemically self-lubricating by the addition of a self-lubricating substance, particularly a self-lubricating resin.

All in all, the inventive idea consists in replacing the polyethylene of the sliding layer by a synthetic resin which is self-lubricating or rendered self-lubricating, so as to be able to use the sliding elements anywhere without having to lubricate their surface. As the self-lubricating resin for the sliding layer of the new elements, the invention proposes a silicone resin, a polyvinylidene fluoride (P.V.D.F.) resin, a furan resin or a polypropylene resin of the homopropylene type or of the static or block copolymer type or a polytetrafluoroethylene resin.

As a resin which is rendered self-lubricating for the abovementioned sliding layer, the invention proposes a normal base resin in which silicone additives are incorporated, either in the form of a resin or in the form of an oil, these additives being uniformly distributed in this base resin.

Other details and particular features of the invention will become apparent from the description to follow.

BRIEF DESCRIPTION OF THE DRAWINGS

The FIGS. 1 to 4 are vertical sections through the sliding layers of four new sliding elements illustrating a number of exemplary embodiments of the invention. In these Figures, the same reference numerals are used to denote identical parts.

DESCRIPTION OF EXEMPLARY EMBODIMENTS

Figure 1:
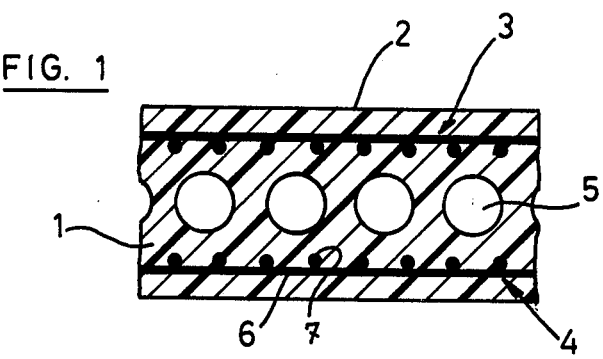

The sliding layer 1 of each sliding element in accordance with the invention is made up of a self-lubricating synthetic base resin which may consist of silicone, polyvinylidene fluoride (P.V.D.F.), furan, homopropylene, polypropylene with static or block copolymers or polytetrafluoroethylene. The base resin may be coloured, opaque or transparent.

The self-lubricating base resin has a low coefficient of friction in relation to a metal or an alloy. Moreover, the use of silicone or polyvinylidene fluoride imparts good mechanical properties to the sliding layer 1, particularly high resistance to traction, compression, bending and torsion. In addition, the silicone or polyvinylidene fluoride gives the sliding surface 2 good resistance to mechanical abrasion. The silicone or the polyvinylidene fluoride also impart to the sliding layer 1 very good thermal stability and good fire resistant properties, whilst preventing the proliferation of microorganisms in this layer 1. In this connection, polyvinylidene fluoride, which has a melting point of 180° C. and a softening point slightly below 180° C., ensures very high resistance and very great stability to heat and cold. Consequently, the sliding layer 1 made of polyvinylidene fluoride is not prone to expansion and contraction and has stable, constant dimensions. Moreover, polyvinylene fluoride also gives the sliding layer 1 considerable resistance to ageing, thanks to being chemically inert to numerous corrosive agents. In particular, polyvinylidene fluoride remains stable under the effect of ultra-violet radiation or even $\beta$ or $\gamma$ radiation.

In alternative methods of production, the sliding layer 1 may consist of a normal base resin which is rendered self-lubricating by means of appropriate silicone-based additives. These additives are silicone resins or oils which are uniformly distributed in the base resin. In this case, the normal base resin may consist of polypropylene. Low density polypropylene has good resistance to cracking under tension and to chemical corrosion. Polypropylene imparts to the sliding layer 1 good rigidity, good impact resistance and good heat resistance. Polypropylene also has a VICAT softening point of above 150° C. and a temperature of bending under load of above 120° C. Polypropylene can be used as a base resin in open-air skating rinks in regions which are exposed to considerable heat radiation.

Whether it is self-lubricating per se or rendered self lubricating by the addition of compounds, the base resin of the sliding layer 1 can be made particularly fire-resistant and self-extinguishing by the addition of Cl$^-$, Fl$^-$, or PO$_4^{---}$ ions or triethylenephosphoramide. Moreover, this base resin may also by rendered waterproof by the addition of suitable hydrophobic products such as calcium stearate or stearic acid. Furthermore, the base resin may also be made even more resistant to the effects of rodents, microorganisms or parasitic and destructive creatures by the addition of a mixture of isomers of trichlorobenzene, ortho-dichlorobenzene, 2-pivaloyl-1,3-indadione, benzophenone or tin derivatives. Finally, the same base resin may also be made resistant to ultra-violet radiation by the addition of U.V. stabilisers such as 2-alkyl-(2-hydroxyphenyl)-2H-benzotriazole, benzophenones, triazine, certain phosphonates or resorcinol monobenzoate.

Figure 2:
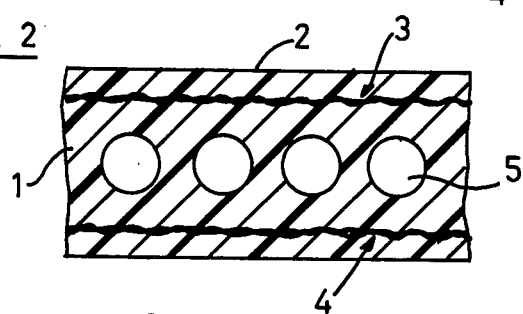
Figure 3:
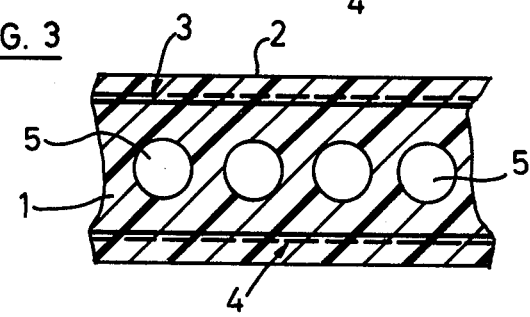

As the Figures show, the sliding layer 1 is mechanically reinforced and dimensionally stabilised by internal reinforcements: an upper reinforcement 3 near the upper sliding surface 1 and a lower reinforcement 4 near the opposite, lower surface. In order to make it lighter, the sliding layer 1 has recesses 5, for example cylindrical parallel recesses, arranged between the reinforcements 3 and 4 in the first three examples (FIGS. 1, 2 and 3). Each internal reinforcement 3 or 4 is preferably based on fibres or strands of glass or asbestos. Advantageously, the glass used has a low soda or potash content so that it resists degradation by hydrolysis resulting from humidity and ensures the stability of the mechanical properties of the sliding layer. The glass or asbestos fibres or strands, which are non-flammable and non-combustible, may be dispersed in the base resin at the sites of the reinforcements 3 and 4, but they may also be combined with one another in order to produce these reinforcements 3 and 4 in various forms.

In the first example, each reinforcement 3 or 4 is formed by superimposing a bundle of twisted, parallel glass fibres 6 and another bundle of glass fibres 7 which are also twisted and parallel but which extend at right angles to the first fibres 6. In this case, the fibres 6 and 7 form a lattice with an open square or rectangular mesh. As a variant, the fibres 6 and 7 may be closer together and intertwined so as to form a woven glass fabric which may optionally have a synthetic covering.

In the second example, each reinforcement 3 or 4 consists of a pad or matting of glass fibres which are cut up and bonded with a binder or mechanically linked by interlacing. In a variant, the pad or matting may be replaced by a roving or woven fabric obtained by assembling parallel strands which comprise continuous glass fibres and are coated with a synthetic coating material.

In the third example, each reinforcement 3 or 4, known as a high modulus reinforcement, is made up of two plies of parallel glass fibres. The plies are placed one above the other and their fibres are aligned at right angles to one another. Moreover, the plies are linked to each other by small interlocking threads. With reinforcements of this kind, the sliding layer 1 will have good mechanical properties and, in particular, high resistance to bending.

Figure 4:
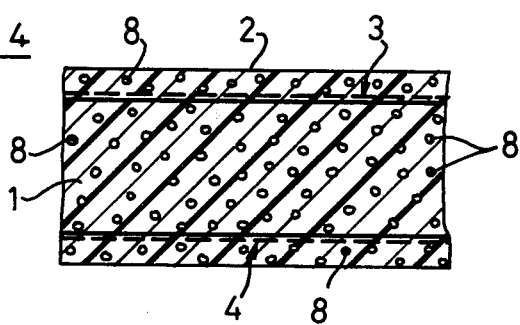

The fourth example (FIG. 4) differs from the preceding one in that it has no recesses 5 as mentioned above and comprises, inside the base resin, a large number of inorganic or organic microspheres 8 having a diameter of between 20 and 200 microns. The microspheres 8 make the sliding laver 1 lighter and render the base resin compressible whilst giving it high shock resistance.

In an alternative embodiment, the reinforcement imparting mechanical strength and dimensional stability may be formed by a number of ends of glass or asbestos fibres dispersed in the base resin.

The sliding layer 1 may be produced individually or made integral with a solid support in the form of a sheet, strip, plate or flooring element. This support generally consists of polypropylene, which has good mechanical properties and a low specific weight and which avoids the phenomenon of stress-cracking thanks to its great thermal inertia.

The sliding layer 1 may be produced continuously using an extrusion machine or discontinuously by means of a heating press. In the former case, the base resin, optionally containing additives and/or microspheres 8 is continuously extruded through the tool of an extrusion machine to form a sheet or strip. The extruded sheet or strip is then, if required, made integral with the support by conventional means, especially adhesive bonding. In this case, the reinforcements 3 and 4 are incorporated in the base resin during extrusion and pass through the extrusion tool at the same time as the resin. It is also possible for the sliding layer 1 and the flexible solid support in the form of a sheet or strip to be extruded simultaneously and, along the same lines, for a base resin which is self-lubricating or rendered self-lubricating and a normal resin carrying the first resin to be processed at the same time by the same extrusion apparatus.

Before being extruded, the base resin which is self-lubricating or rendered self-lubricating used in the sliding layer 1 may have benzene-sulphohydrazide added to it to cause gassing with the aim of incorporating gas bubbles therein. During extrusion these bubbles decrease in volume but remain enclosed in the base resin afterwards in order to give it its cellular texture. These bubbles prevent the propagation and development of microscopic cracks appearing in the hardened base resin.

After extrusion, the base resin which is self-lubricating or rendered self-lubricating used in the sliding layer 1 may also undergo a graining treatment by the action of a rotary calendering cylinder with a rough surface with a slight relief pattern, on the sliding surface 2. This results in a grained sliding surface 2 which does not require any sanding down during use. Moreover, the graining of the sliding surface 2 substantially reduces the state of residual tension in that zone of the sliding layer 1 which is adjacent to the sliding surface 2.

With regard to the sliding surface 2, it should be noted that this surface can be rendered electrically antistatic by the addition of glycerol monooleate, glycerol or ethanol monostearate or certain glycerides to the base resin of the sliding layer 1 during the preparation of this resin with a view to extruding it.

In the case when the sliding layer is produced by means of a heating press, the base resin, optionally containing additives and/or microspheres 8, is compressed in a heated mould. The reinforcements 3 and 4 are placed in the mould with the resin before the pressure is applied. After unmoulding and cooling, the sliding layer 1 thus obtained may optionally be made integral with an appropriate solid support in the form of a plate or flooring element.

In cases where the sliding layer 1 is produced individually, its two chief surfaces may be treated in the same way to form two opposite sliding surfaces 2. In this case, the sliding element can be used doubly. It merely has to be turned over at the place of use.

In order to reduce parasitic internal tensions resulting from the extrusion or compression, the sliding element or, more precisely, the sliding layer 1 may undergo annealing, which is known per se.

The sliding layers 1 described and shown are intended for the production of sheets for skating rink surfaces. The new ideas of the invention can be applied to other elements and, in particular, to a skate. The skate has a lower blade comprising a lower strip integral with the remaining part. The strip consists of a base resin which is self-lubricating or rendered self-lubricating, comparable to that of the abovementioned sheet.

Obviously, the invention is not limited exclusively to the embodiments shown, but a number of modifications may be made to the form, arrangement and constitution of some of the elements used in the production thereof, provided that these modifications do not conflict with any of the following claims.

What is claimed is:

1. A sliding element intended for use in skating devices comprising a solid slide layer which consists of a self-lubricating synthetic material base resin selected from the group consisting of a silicone resin, a polyvinylidene fluoride resin and a furan resin.

2. A sliding element according to claim 1, wherein said self-lubricating resin is a silicone resin.

3. A sliding element according to claim 1, wherein said self-lubricating resin is a polyvinylidene fluoride (P.V.D.F.) resin.

4. A sliding element according to claim 1, wherein said self-lubricating resin is a furan resin.

5. A sliding element according to claim 1, wherein said self-lubricating substance is a silicone oil uniformly distributed in the base resin.

6. A sliding element according to claim 1, wherein the base resin also includes at least one further additive to give said slide layer at least one further mechanical or chemical property.

7. A sliding element according to claim 6, wherein the base resin further includes at least one internal reinforcement selected from the group consisting of glass or asbestos fibers or strands dispersed in the base resin or assembled in the form of a woven fabric, optionally coated with a synthetic coating, or in the form of a mat which is interlocked or coated with a synthetic binder.

8. A sliding element according to claim 6, wherein said slide layer is rendered fire-resistant and self-extinguishing by the addition of Cl⁻, Fl⁻ or $PO_4^{3-}$ ion or triethylenephosphoramide as said further additive.

9. A sliding element according to claim 6, wherein said slide layer is rendered waterproof by the addition of calcium stearate, stearic acid or a similar hydrophobic product as said further additive.

10. A sliding element according to claim 6, wherein said slide layer is rendered resistant to the action of rodents, microorganisms or parasitic or destructive creatures by the addition of a mixture of isomers of trichlorobenzene, ortho-dichlorobenzene, 2-pivaloyl-1,3-indadione, benzophenone or tin derivatives as said further additive.

11. A sliding element according to claim 6, wherein said further additive comprises inorganic microspheres having a diameter preferably between 20 and 200 microns.

12. A sliding element according to claim 6, wherein said slide layer is given a cellular texture by the addition of a further additive comprising benzene-sulphohydrazide.

13. A sliding element according to claim 6, wherein said sliding surface is rendered electrically antistatic by the addition of glycerol monooleate, glycerol or ethanol monostearate, or certain glycerides as a further additive.

14. A sliding element intended for use in skating devices comprising a solid slide layer which consists of a base resin consisting of propylene resin and including at least one silicone-based additive uniformly distributed in the base resin, said silicone-based additive being selected from the group consisting of silicone resins and silicone oils.

15. A sliding element according to claim 14, wherein the base resin also includes at least one further additive to give said slide layer at least one further mechanical or chemical property.

16. A sliding element according to claim 15, wherein said further additive is selected from the group consisting of $CL^-$, $FL^-$ and $PO_4^{3-}$ ions and triethylenephosphoramide to render said slide layer fire-resistant and self-extinguishing.

17. A sliding element according to claim 15, wherein said further additive is selected from the group consisting of calcium stearate, stearic acid or a similar hydrophobic product to render said slide layer waterproof.

18. A sliding element according to claim 15, wherein said further additive consists of a mixture of isomers of trichlorobenzene, ortho-dichlorobenzene, 2-pivaloyl-1,3-indadione, benzophenone or tin derivatives to render said slide layer resistant to the action of rodents, microorganisms and parasitic or destructive creatures.

19. A sliding element according to claim 15, wherein said further additive comprises inorganic microspheres having a diameter preferably between 20 and 200 microns.

20. A sliding element according to claim 15, wherein said further additive comprises benzene-sulphohydrazide to give said slide layer a cellular texture.

21. A sliding element according to claim 15, wherein said further additive is selected from the group consisting of glycerol monooleate, glycerol or ethanol monostearate, and certain glycerides to render said slide layer electrically antistatic.

22. A sliding element according to claims 15 to 21, wherein the base resin further includes at least one internal reinforcement selected from the group consisting of glass or asbestos fibers or strands dispersed in the base resin or assembled in the form of a woven fabric, optionally coated with a synthetic coating, or in the form of a mat which is interlocked or coated with a synthetic binder.

* * * * *